United States Patent [19]

Bannick et al.

[11] Patent Number: 5,202,080
[45] Date of Patent: Apr. 13, 1993

[54] FLUIDIZED BED APPARATUS

[75] Inventors: David E. Bannick, Roseville; James S. Nelson, Moundsview, both of Minn.

[73] Assignee: BGK Finishing Systems, Inc., Blaine, Minn.

[21] Appl. No.: 808,914

[22] Filed: Dec. 17, 1991

[51] Int. Cl.$^5$ .............................................. C22B 1/10
[52] U.S. Cl. .................................. 266/172; 266/249; 432/15
[58] Field of Search ................. 266/172, 249; 432/15, 432/58

[56] References Cited

U.S. PATENT DOCUMENTS 4,563,151  1/1986  Vogel ..................................... 432/58

OTHER PUBLICATIONS

Copy of page from Aug. 1991 issue of *Modern Casting* showing advertisement of Dependable Foundry Equipment Co., Inc.

*Primary Examiner*—Scott Kastler
*Attorney, Agent, or Firm*—Merchant, Gould, Smith, Edell, Welter & Schmidt

[57] ABSTRACT

An apparatus is disclosed for heat treating a granular material. The apparatus includes a retort having a volume sized to receive a bed of fluidizing particles at a predetermined elevation within the volume and a plurality of electrically powered infrared radiation sources. The sources are submerged within the bed. The apparatus includes a deflector plate for deflecting granular material from an upper elevation of said bed to close proximity to said radiation sources.

2 Claims, 4 Drawing Sheets

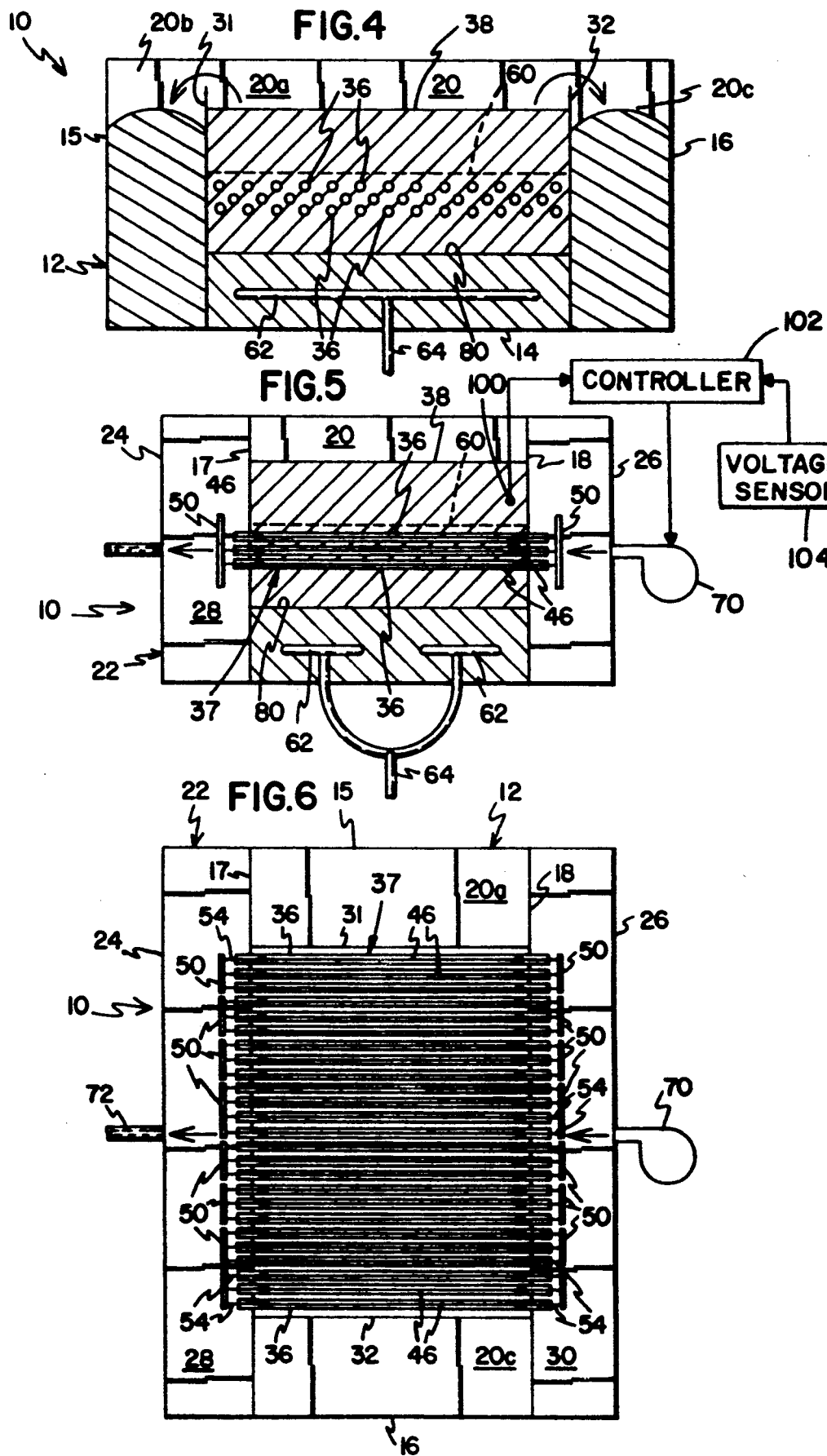

FLUIDIZED BED APPARATUS

BACKGROUND OF THE INVENTION

1. Field of the Invention

This invention pertains to a fluidized bed heat treatment apparatus with submerged infrared radiation heating sources. More particularly, this invention pertains to such an apparatus having improved means for insuring uniform heat treatment of fluidized particles.

2. Description of the Prior Art

The use of fluidized bed furnaces for heat treating a product is well known. Such furnaces generate an extremely hot bed of fluidizing particles such as aluminum oxide. The furnaces can be used for both continuous processing of a product or batch processing of products.

In addition to using such apparatus for processing of products, commonly assigned and co-pending U.S. patent application Ser. No. 07/598,415, filed Oct. 16, 1990, teaches a fluidized bed apparatus where the fluidized particles are foundry sand in a reclaiming process. In such a reclaiming process, it is desirable that the fluidized particles (i.e. the sand to be reclaimed) are all properly heat treated such that the high percentage of the sand exiting the heat treatment apparatus is being properly heat treated. It is an object of the present invention to provide a fluidized bed heat treatment apparatus with enhanced uniformity of heat treatment of the fluidized particles.

SUMMARY OF THE INVENTION

According to the preferred embodiment of the present invention an apparatus is disclosed for heat treating. The apparatus includes a retort having walls defining a furnace volume. A bed of fluidizing particles is disposed within the volume. A heat treatment source is submerged within the bed. The apparatus further includes means for directly fluidized materials toward the heat source.

BRIEF DESCRIPTION OF THE DRAWINGS

FIG. 4 is a side elevation schematic representation of the furnace;

FIG. 5 is an end elevation view, shown schematically, of the furnace;

FIG. 6 is a top plan view, shown schematically, of the furnace;

DESCRIPTION OF THE PREFERRED EMBODIMENT

Figure 1:
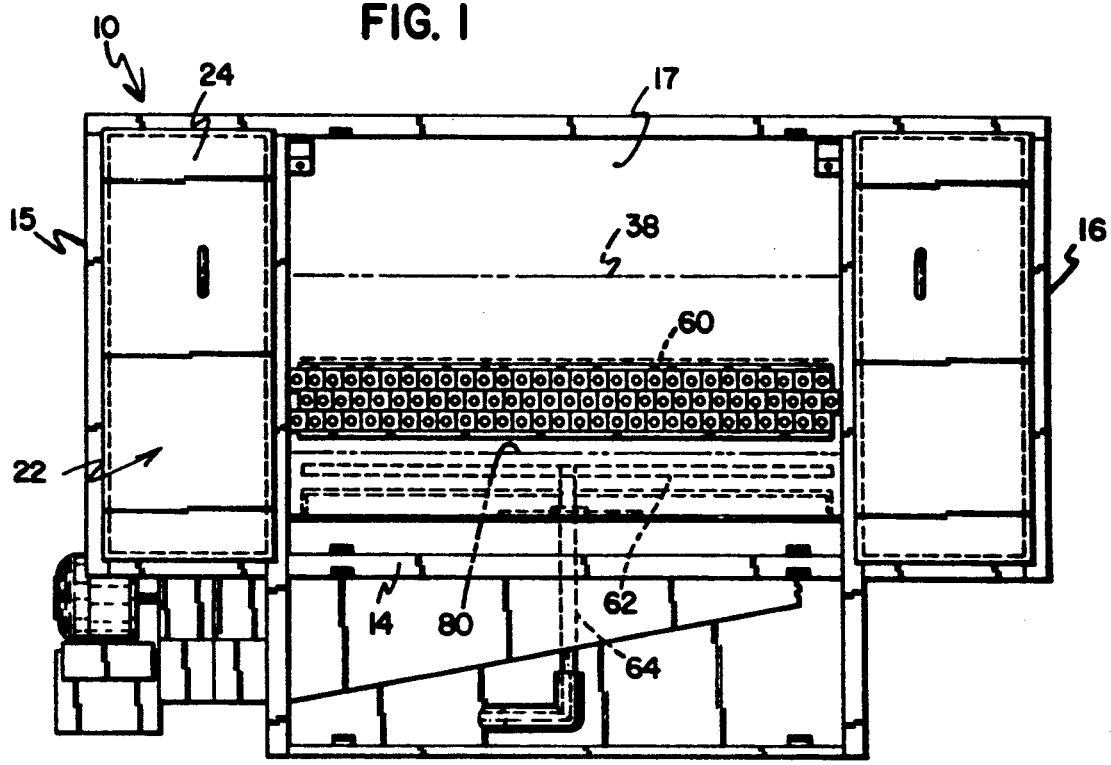
FIG. 1 is a side elevation view of a fluidizing bed furnace as improved, with a portion of an outer skin removed to expose certain interior elements of the furnace.

The present invention is an improvement over the apparatus and method shown and described in co-pending and commonly assigned U.S. patent application Ser. No. 07/598,415, filed Oct. 16, 1990. For purposes of clarity, that apparatus will now be described here. The improvement of the present invention is more fully described, infra, under the section heading "C. Improvement of the Present Invention".

A. Description of the Apparatus

Referring now to the various figures in which identical elements are numbered identically throughout, the description of the preferred embodiment will now be given with reference to a furnace 10. Shown best in FIGS. 4 and 5, the furnace 10 includes a retort 12, which is preferably formed of R330 stainless steel or the like. The retort 12 includes a bottom wall 14, end walls 15,16 and side walls 17,18. Walls 14-18 cooperate to define a retort interior 20. A cover (not shown in the Figures) may be provided to cover the top of the retort 12.

The furnace 10 also includes an outer shell 22 shown best in FIGS. 5 and 6. Outer shell 22 includes a first outer shell wall 24 covering wall 17, and a second outer shell wall 26 covering wall 18. In FIG. 1, a central portion of shell wall 24 has been removed to expose wall 17. Wall 24 and wall 17 cooperate to define an exhaust plenum 28. Walls 26 and 18 cooperate to define an inlet plenum 30.

As best shown in FIGS. 4 and 6, interior divider walls 31 and 32 are provided within the interior 20. Walls 31,32 extend between side walls 17 and 18 and are parallel to end walls 15 and 16. The divider walls 31,32 extend from floor 14 partially toward the top of the retort 12. Walls 31,32 divide retort interior 20 into a fluidizing chamber 20a, a first overflow chamber 20b, and a second overflow chamber 20c (see FIG. 4).

A plurality of quartz tubes 36 are shown extending between and through walls 17 and 18. As shown, the tubes 36 are disposed in parallel alignment, generally perpendicular to side walls 17,18 and parallel to the floor 14 of the retort 12. The tubes 36 are disposed within the fluidizing portion 20a of the interior 20, and are located beneath a predetermined elevation 38 (see FIG. 4) of fluidizing particles to be retained within the chamber 20a.

Figure 3:
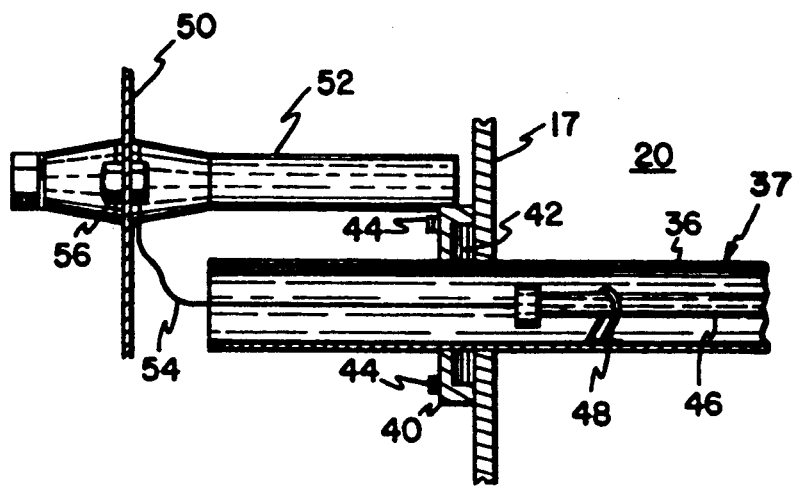
FIG. 3 is a side elevation view, shown partially in section, showing connection of infrared heating elements to bus plates.

FIG. 3 shows attachment of the tube 36 to side wall 17. The quartz tube 36 is similarly attached to side wall 18. As shown in FIG. 3, the tube 36 extends through side wall 17, and is connected to the side wall 17 by a steel mounting clamp 40. The clamp 40 houses a plurality of ceramic washers 42. The clamp 40 is attached to side wall 17 by bolts 44.

An infrared lamp 46 is disposed within each of tubes 36, as best shown in FIGS. 2, 3, 5 and 6 (for clarity, lamps are not shown within the tubes 36 in FIGS. 1 and 4). The lamp 46 is completely contained between walls 17,18, and is retained in coaxial alignment within tube 36 by a mounting clip 48.

Figure 2:
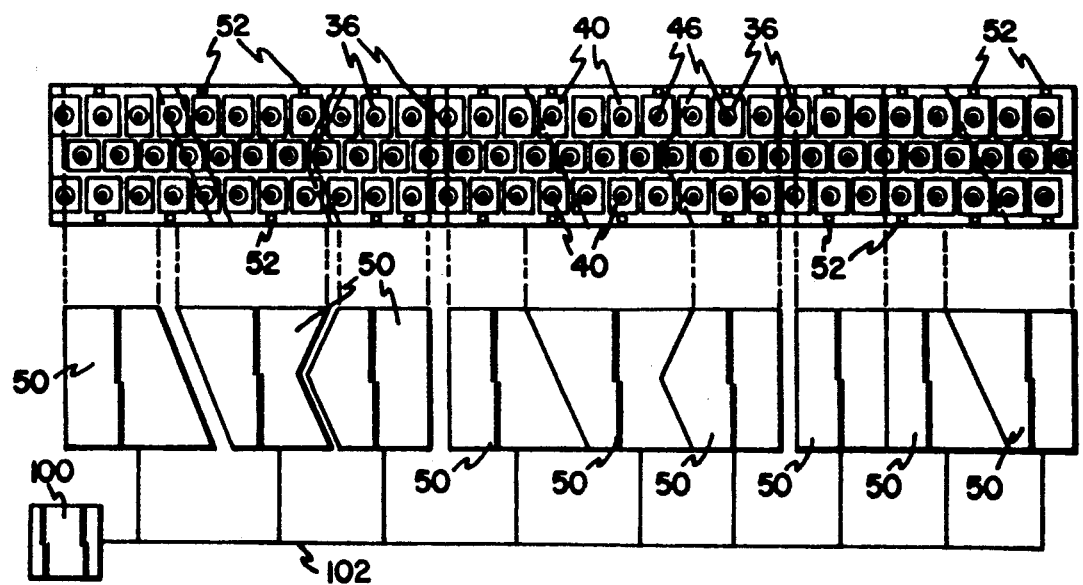
FIG. 2 is an enlarged view of certain of the interior elements of the furnace of FIG. 1, with bus plates shown removed.

To provide electrical energy to the plurality of lamps 46, a plurality of bus bar plates 50 are provided. (For clarity bus bar plates are not shown in FIGS. 1 and 4.) As shown in FIG. 2, nine bus bar plates are provided for each side 17,18 of the retort 12. In the schematic representation of FIG. 6, eight bus bar plates are shown on each side.

The bus bar plates 50 are electrically conductive plates of metal. Each plate 50 is connected to a separately controllable source (not shown) of electrical power to energize the plate 50.

The plates 50 are secured to the walls 17,18 by bus bar plate mounts 52 (see FIG. 3), which are preferably ceramic. A lead 54 connects the infrared lamp 46 to the bus bar plate 50. The lead 54 is connected to the bus bar plate 50 by a nut and bolt combination 56.

As best shown in FIG. 2, a plurality of lamps 46 are covered by any given bus bar plate 50. In the expanded view of FIG. 2, each of the bus bar plates 50 is removed from covering the lamps 46 and tubes 36. The positioning of the bus bar plates 50 over the lamps 45 in FIG. 2 is shown in phantom lines. As a result of having a plurality of lamps 46 covered by a plurality of different bus bar plates 50, the length of the fluidizing chamber 20a can be divided into a plurality of zones. Each bus bar plate 50 with its associated lamps 46 constitutes a given zone. By separately regulating a current to each bus bar plate 50, the intensity of the lamps connected to each bus bar plate 50 can be separately controlled. As a result, a temperature gradient can be created across the length of the chamber 20a.

Shown in FIGS. 1, 4 and 5, a stainless steel screen 60 is placed above the lamps 46 and quartz tubes 36. The screen 60 prevents a product that is being heat treated from falling onto the quartz tubes 36 and possibly damaging them.

Fluidizing tubes 62 are provided disposed between the floor 14 and the quartz tubes 36. The tubes 62 are connected via conduit 64 to a source (not shown) if a fluidizing gas. The fluidizing gas may be air or any inert gas such as nitrogen. The fluidizing tubes 62 may be such as those shown and described in U.S. Pat. No. 4,752,061 and indicated by reference numerals 98 of that patent.

A coolant mechanism is provided to pass a cooling fluid (preferably air) through the tubes 36 to cool the infrared lamps 46. A blower 70 is provided connected to inlet plenum 30. An exhaust fan (not shown) may be connected through an exhaust conduit 72 to exhaust plenum 28. As a result, cooling air may be forced from plenum 30 through each of tubes 36 into plenum 28 and out exhaust conduit 72.

A bed of fluidizing particles (preferably granular aluminum oxide) is provided within the retort 12. A first layer 80 of coarse particle (preferably of 12 grit size) is provided covering the fluidizing tubes 62 and terminating beneath the quartz tubes 36. Finer aluminum oxide sand (preferably of 100 grit size) rests on top of the coarser sand 80, and terminates at level 38. The coarser sand 80 diffuses the fluidizing gas from the fluidizing tubes 62, and distributes it evenly to the quartz tubes 36.

In operation, the infrared lamps 46 may heat from 0#–4000#F. The aluminum oxide will heat from 0#–2100#F. A controller 100 (schematically shown in FIG. 2) is connected through control lines 102 to each of bus plates 50. Through operation of controller 100, the potential on each of bus plates 50 may be separately controlled. Accordingly, the plurality of infrared lamps 46 are divided into a plurality of separately controllable zones.

In operation, the lamps 46 heat the aluminum oxide. The fluidizing gas from tubes 62 fluidizes the aluminum oxide. The divider walls 31,32 capture within chambers 20b and 20c any aluminum oxide which spills out of the fluidizing chamber 20a.

Each of lamps 46 and tubes 36 comprise a lamp assembly 37 (shown numbered in FIGS. 3, 5 and 6). As previously indicated, a cooling gas is passed through the lamp assemblies 37. In operation, the temperature of the apparatus can be quite high. For example, the temperature surrounding the assemblies 37 will commonly exceed 2100#F. At temperatures in excess of 1500#F, the quartz tubes 36 may deteriorate. For example, from 1500 to 1800#F, quartz softens and sags.

The air passing through the quartz tubes 36, cools the quartz tubes 36 to prevent sagging. However, the air flow can adversely effect the efficiency of the infrared lamps 46. Accordingly, air flow through the quartz tubes 36 must be balanced to provide sufficient cooling to prevent the quartz tubes 36 from sagging while minimizing the adverse impact on the efficiency of the lamps 46.

To achieve the desired balancing, air flow through quartz tubes 36 is preferably only provided when the temperature of fluidized bed 38 exceeds a predetermined temperature. In a preferred embodiment, the predetermined temperature is 1500#F.

The amount of air flow through the tubes 36 is selected to balance the thermal energy on the tubes 36. Namely, the bed 38 draws thermal energy from the tubes 36. If the thermal energy drawn from the tubes 36 is insufficient to keep the temperature of the tubes 36 below the predetermined temperature, air flow is passed through the tubes 36 at a rate selected to draw energy away from the tubes 36. The amount of air flow is a function of the length of the tubes 36, the voltage across the lamps 46 and the ambient temperature (i.e., the temperature of the bed in the immediate vicinity of the tubes 36). The actual amount of air flow is empirically derived for a given apparatus 10 and will vary with the operating process in which it is used.

To achieve the balancing, a thermocouple 100 (schematically shown only in FIG. 5) is provided for sensing the temperature within bed 38 in the vicinity of the tubes 36. Thermocouple 100 provides a signal to a controller 102. The controller 102 also receives an input from a voltage sensor 104 which senses a voltage across the lamps 46. Comparing the voltage on the lamps 46 and the temperature within bed 38, the controller 102 operates blower 70 to force coolant gas through the quartz tubes 36 when the temperature within the bed 38 exceeds the predetermined temperature. The air flow through the quartz tubes 36 is selected to be an increasing function of the voltage across the lamps 46 and to be increasing with the increased temperature measured by thermocouple 100. The increasing function is selected for the air flow to be the minimum air flow necessary to prevent deterioration of the quartz tubes 36.

The preferred embodiment discloses use of air cooled lamp assemblies 37. A further embodiment may replace the assemblies with resistance type silicon carbide heating elements (also called glow bars). These elements may be electrically energized to heat and generate infrared radiation. These elements may be used in direct contact with the bed and do not require quartz conduits (such as tubes 36) or air cooling. Such elements are commercially available such as those marketed by Smith-Sharpe of Minneapolis, Minn.

B. Novel Method for Foundry Sand Reclamation Using the Novel Apparatus

The apparatus 10 described above has been illustrated for use with heat treating a product within a fluidized bed. In addition to those beneficial uses, the apparatus 10 is surprisingly useful for reclaiming foundry sand.

In the foundry industry, various types of sands are used to form moldings from which metal castings are made. These sands include so-called "no-bake" sands and so-called "green" sand. A no-bake sand includes an organic binder which is air-cured to bind the sand into a sand casting. Green sand includes an inorganic binder which is baked to bind the sand into a casting.

Government agencies (such as the U.S. Environmental Protection Agency) have severely restricted the disposal of foundry sand. For example, foundry sand cannot be readily disposed in landfills since it is considered a hazardous material.

Various methods have been devised to reclaim foundry sand. No-bake sand is reclaimed through a mechanical method of passing the sand through a crusher and a scrubber to reclaim about 80% of the sand.

The foundry industry has been experimenting with various methods to reclaim sand through temperature applications (referred to in the industry as "killing" the sand at elevated temperatures). For example, the industry has used gas fired fluidized beds to thermally reclaim the sand. An example of such is found in U.S. Pat. No. 4,478,572.

To reclaim green sand, the sand must be heat treated to temperatures in excess of 1400 to 1500#F. When natural gas is used as the heat source, a substantial amount is required. Also, the capital cost of such equipment is very high.

The illustrated apparatus is particularly suitable for reclaiming foundry sand including green sand. To accomplish this, the foundry sand is used as the fluidized bed in the furnace 10 instead of using the granular aluminum oxide previously described as the preferred fluidized bed particles.

Figure 7:
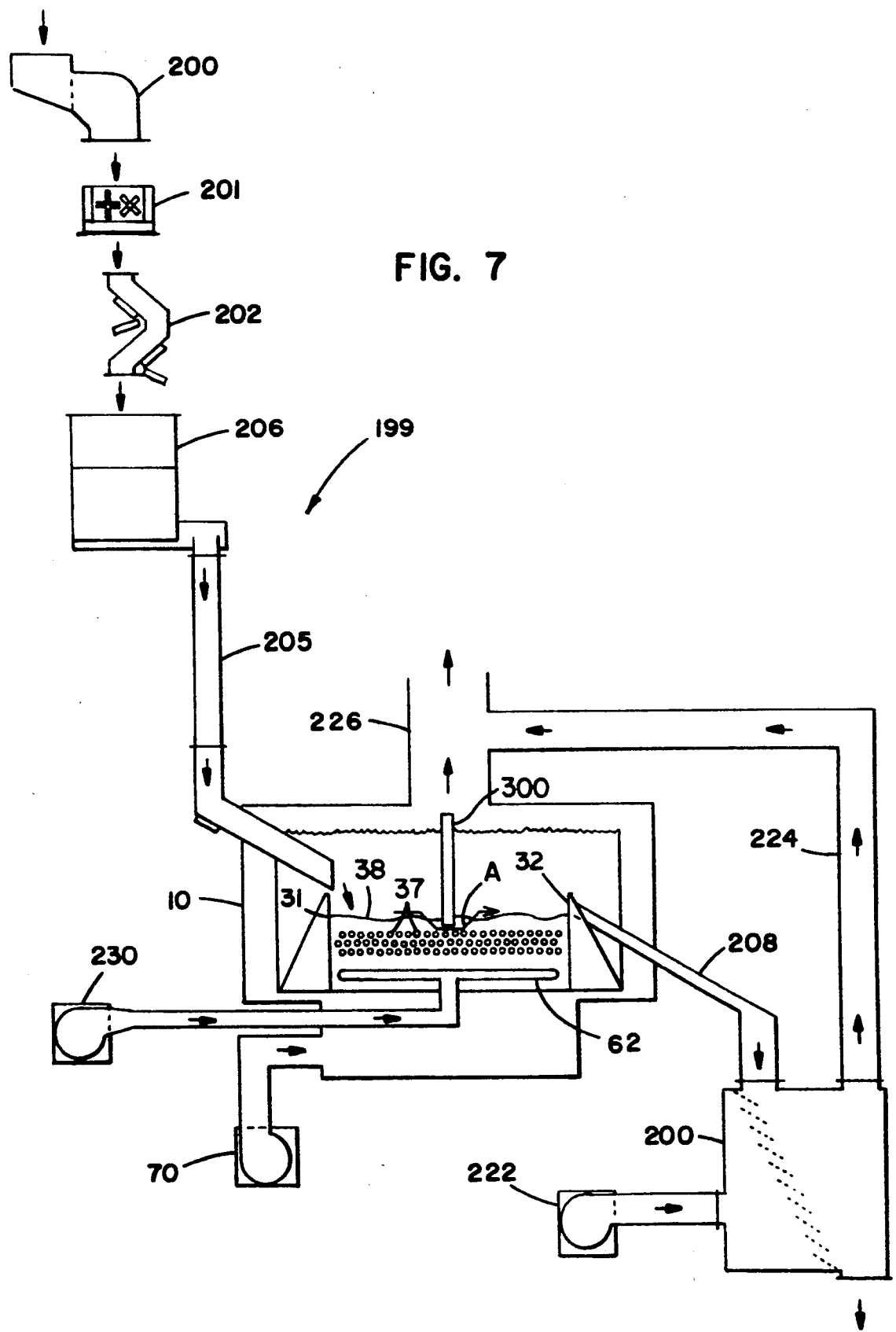
FIG. 7 is a view of a processing system using the apparatus and incorporating the present improvement in a processor for reclaiming foundry sand.

FIG. 7 shows, in schematic format, the use of the apparatus 10 to reclaim green sand. As shown in FIG. 7, a reclamation system 199 would include feed hopper 200 for passing sand to a crusher 201. Crusher 201 crushes the sand and passes it to a magnetic separator 202 to separate out ferromagnetic material. A metering hopper 206 collects sand from separator 202 and feeds the separated sand (via a conduit) 209, to the furnace 10. The fully reclaimed sand is passed from apparatus 10 through discharge conduit 208.

The hot reclaimed sand is passed from discharge conduit 208 to a cascade cooler 220. A blower 222 blows cooling air to cooler 220. A blower 222 blows cooling air to cooler 220 with the air exhausted through conduit 224 to main exhaust conduit 226 from which it passes to filters and scrubbers (not shown).

A blower 230 forces air to the fluidizing tube 62. In use of the apparatus 10 for foundry sand recovery, the fluidizing gas is oxygen-containing (preferably air) with oxygen reacting with the sand binder. Resulting product gas (e.g., $CO$, $CO_2$) and dust are drawn off through main conduit 226.

Use of the furnace 10 to reclaim foundry sand has run with no-bake sand at 750#F with a reclamation of about 94% by weight, of the sand. Also, 94% of green sand has been reclaimed when operating the furnace to create a fluidized bed temperature of 1400 to 1600#F. The latter is of substantial significance to the foundry industry which, prior to the present invention, was not capable of economically reclaiming green sand.

The present apparatus has numerous advantages for use in reclaiming foundry sand. It has a much lower capital cost than prior thermal treatment apparatus for foundry sand. It operates at a much lower energy cost than prior thermal treatment apparatus and has a fast throughput.

The actual physics and chemistry by which the apparatus 10 is so effective in reclaiming sand is not fully understood. However, it is believed the submergence of an infrared heat source in the bed of sand causes individual sand grains to experience momentary period of very high temperature. For example, while the bed may have an average temperature of about 1400#F, individual grains come in momentary close proximity to submerged heat sources (i.e., IR lamps or glow bars) which may have very high temperatures. It is suspected the momentary very high temperature makes the sand binders brittle and burn off. As a result, the sand reclaimed through the novel method requires very little scrubbing compared to sand reclaimed through prior art techniques.

C. Improvement of the Present Invention

Figure 8:
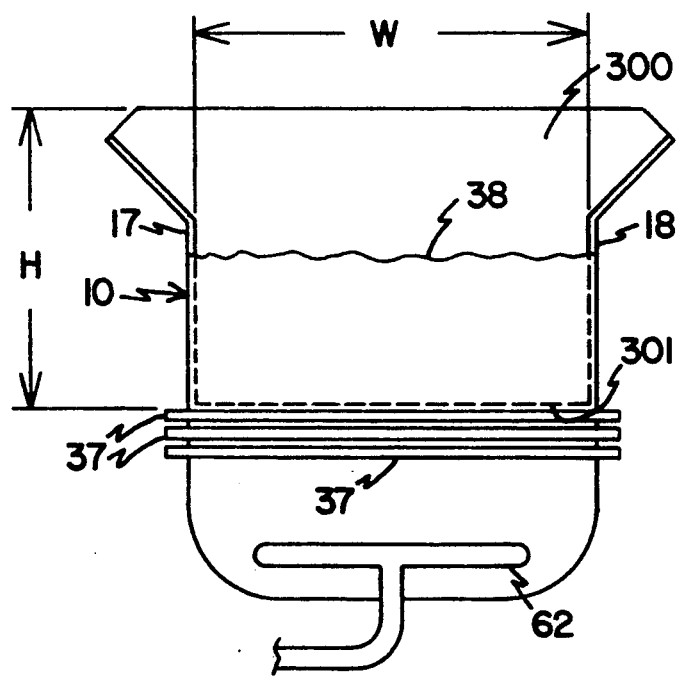
FIG. 8 is a side elevation view, in section, showing the improvement of the present invention.

As shown in FIGS. 7 and 8, a deflector or baffle plate 300 is disposed within the furnace 10. Plate 300 has a width (W) selected for the plate 300 to extend substantially between side walls 17 and 18. The plate 300 has a depth or height (H) selected for the plate 300 to extend from an elevation above that of the granular sand 38. A lower edge 301 of plate 300 is disposed within close proximity to lamp assemblies 37. As shown in FIG. 7, plate 300 is disposed approximately centrally located within furnace 10. Accordingly, granular particulate material flowing from wall 31 to wall 32 (as shown in FIG. 7) is urged by plate 300 for material on the surface of the bed 38 to be deflected downwardly in close proximity to lamp assemblies 37 as indicated by arrow A in FIG. 7. Accordingly, all granular material comes within close proximity of the lamps 37 to insure that each grain of material is properly heat treated. The plate 300 avoids movement of sand or other particulate material strictly over the surface of the bed. The dam 300 controls the amount of time the particulate matter remains in contact or adjacent the radiation source 37.

Through the foregoing detailed description of the present invention, it has been shown how the invention has been obtained in a preferred manner. However, modifications and equivalents of the disclosed concepts, such as those which will readily occur to one skilled in the art, are intended to be included within the scope of this invention.

What is claimed is:

1. An apparatus for heat treating a granular material, said apparatus comprising:
   volume defining means for defining a volume sized to receive a bed of fluidizing particles with said bed selected to exceed a predetermined elevation within said volume;
   means for urging said bed to flow in a predetermined generally horizontal path of travel from a first end of said volume to a second end of said volume;
   a plurality of heating elements disposed submerged within said bed;
   flow control means for directing particulate material from an upper elevation of said bed toward said plurality of heating elements; and
   said flow control means including a deflector plate disposed within said bed and at least partially blocking said path of travel of said fluidizing particles within said bed, said deflector plate generally perpendicular to said path, said deflector plate including a lower edge positioned in close proximity to said plurality of heating elements with said plate being substantially solid from said lower edge to a point above said elevation.

2. An apparatus according to claim 1 wherein said plate has a width substantially equal to an interior width of said volume defining means.

* * * * *